(12) United States Patent
Nakashin (10) Patent No.: US 11,003,285 B2
(45) Date of Patent: May 11, 2021

(54) DISPLAY APPARATUS AND METHOD FOR CONTROLLING DISPLAY APPARATUS

(71) Applicant: SEIKO EPSON CORPORATION, Tokyo (JP)

(72) Inventor: Yoshitaka Nakashin, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/677,836

(22) Filed: Nov. 8, 2019

(65) Prior Publication Data

US 2020/0150824 A1 May 14, 2020

(30) Foreign Application Priority Data

Nov. 9, 2018 (JP) .............................. JP2018-211130

(51) Int. Cl.
| | | |
|---|---|---|
| *G06F 3/048* | (2013.01) | |
| *G06F 3/042* | (2006.01) | |
| *G06F 3/038* | (2013.01) | |
| *G06F 3/0354* | (2013.01) | |

(52) U.S. Cl.
CPC .......... *G06F 3/0425* (2013.01); *G06F 3/0386* (2013.01); *G06F 3/03542* (2013.01)

(58) Field of Classification Search
None
See application file for complete search history.

(56) References Cited

U.S. PATENT DOCUMENTS

| | | | | |
|---|---|---|---|---|
| 2010/0325527 | A1* | 12/2010 | Estrada ................. | G06F 40/169 715/230 |
| 2014/0192089 | A1* | 7/2014 | Honda ................... | G06F 3/005 345/661 |
| 2017/0110083 | A1* | 4/2017 | Yanazume ............. | G09G 5/003 |
| 2018/0069962 | A1* | 3/2018 | Kato ...................... | H04M 3/567 |

FOREIGN PATENT DOCUMENTS

| | | |
|---|---|---|
| JP | 2004-053760 A | 2/2004 |
| JP | 2017-173675 A | 9/2017 |

* cited by examiner

*Primary Examiner* — Joseph R Haley
(74) *Attorney, Agent, or Firm* — Oliff PLC (57) ABSTRACT

A projector includes a communication section that accepts image information supplied from an image supplying apparatus, an image projection section that displays an image based on the image information on a display surface, a detector that detects a pointing position on the display surface at which a light emitting pen is pointing, a drawn image generator that generates a drawn image based on the pointing position detected by the detector, a display controller that causes the image projection section to display the drawn image, and a storage that stores the drawn image in association with the IP address. In a case where the image supplying apparatus, which supplies the communication section with the image information, is changed, the display controller reads the drawn image corresponding to the IP address of the changed image supplying apparatus from the storage and causes the image projection section to display the read drawn image.

5 Claims, 6 Drawing Sheets

DISPLAY APPARATUS AND METHOD FOR CONTROLLING DISPLAY APPARATUS

The present application is based on, and claims priority from JP Application Serial Number 2018-211130, filed Nov. 9, 2018, the disclosure of which is hereby incorporated by reference herein in its entirety.

BACKGROUND

1. Technical Field

The present disclosure relates to a display apparatus and a method for controlling the display apparatus.

2. Related Art

As a display apparatus that displays an image on a display surface, there is a known display apparatus capable of drawing a figure, a letter, and other objects on a display surface using a pointing element, such as a light emitting pen. In a display apparatus of this type, a user performs drawing in relation to an image displayed by the display apparatus in many cases. Therefore, when the displayed image is changed, the drawn figure or any other drawn object prevents visual recognition of a new image in some cases. To address the problem, JP-A-2017-173675 proposes a display apparatus that detects a change in the displayed image and deletes the drawn figure or any other drawn object when the image changes. JP-A-2017-173675 further describes that when the displayed image returns to the original image, the deleted figure or any other deleted object is restored.

In the display apparatus described in JP-A-2017-173675 however, it is necessary to keep analyzing the displayed image to detect a change in the image, resulting in a problem of an increase in the burden on the display apparatus.

SUMMARY

A display apparatus according to an aspect of the present application includes a communication section that accepts image information supplied from an image supplying apparatus over a network, a display section that displays an image based on the image information accepted by the communication section on a display surface, a detector that detects a pointing position on the display surface at which a pointing element is pointing, a generator that generates a drawn image based on the pointing position detected by the detector, a display controller that causes the display section to display the drawn image generated by the generator, and a storage that stores the drawn image in association with identification information for identifying the image supplying apparatus, and when the image supplying apparatus, which supplies the communication section with the image information, is changed, the display controller reads the drawn image corresponding to the identification information that identifies the changed image supplying apparatus from the storage and causes the display section to display the read drawn image.

In the display apparatus described above, the identification information may be an IP address of the image supplying apparatus.

In the display apparatus described above, when the image supplying apparatus, which supplies the communication section with image information, is changed, the display controller may delete the drawn image displayed before the change.

In the display apparatus described above, a first image supplying apparatus that is the image supplying apparatus and a second image supplying apparatus that is the image supplying apparatus may be connected to the communication section. A first drawn image corresponding to the identification information that identifies the first image supplying apparatus and a second drawn image corresponding to the identification information that identifies the second image supplying apparatus may be stored in the storage. The communication section may accept the image information supplied from the first image supplying apparatus. When the communication section accepts the image information supplied from the second image supplying apparatus in the state in which the display controller causes the display section to display the first drawn image, the display controller may delete the first drawn image displayed by the display section and cause the display section to display the second drawn image.

A display apparatus according to another aspect of the present application includes a plurality of image interfaces that accept image information supplied from an image supplying apparatus, a selector that selects one image interface from the plurality of image interfaces, a display section that displays an image based on the image information supplied to the image interface selected by the selector on a display surface, a detector that detects a pointing position on the display surface at which a pointing element is pointing, a generator that generates a drawn image based on the pointing position detected by the detector, a display controller that causes the display section to display the drawn image generated by the generator, and a storage that stores the drawn image in association with the image interface selected by the selector, and when the image interface selected by the selector is changed, the display controller reads the drawn image corresponding to the changed image interface from the storage and causes the display section to display the read drawn image.

In the display apparatus described above, when the image interface selected by the selector is a first image interface that accepts the image information supplied from the image supplying apparatus via a network, the storage may store the drawn image in association with identification information for identifying the image supplying apparatus, which supplies the image information, and when the image supplying apparatus, which supplies the first image interface with the image information, is changed, the display controller may read the drawn image corresponding to the identification information that identifies the changed image supplying apparatus and cause the display section to display the read drawn image.

A method for controlling a display apparatus according to another aspect of the present application includes accepting image information supplied from an image supplying apparatus over a network, displaying an image based on the image information on a display surface, detecting a pointing position on the display surface at which a pointing element is pointing, generating a drawn image based on the detected pointing position, displaying the drawn image on the display surface, and storing the drawn image in a storage in association with identification information for identifying the image supplying apparatus, and when the image supplying apparatus, which supplies the image information, is changed, the drawn image corresponding to the identification information that identifies the changed image supplying apparatus is read from the storage and displayed on the display surface.

A method for controlling a display apparatus according to another aspect of the present application includes selecting one image interface from a plurality of image interfaces that each accept image information supplied from an image supplying apparatus, displaying an image based on the image information supplied to the selected image interface on a display surface, detecting a pointing position on the display surface at which a pointing element is pointing, generating a drawn image based on the detected pointing position, displaying the drawn image on the display surface, and storing the drawn image in a storage in association with the selected image interface, and when the selected image interface is changed, the drawn image corresponding to the changed image interface is read from the storage and displayed on the display surface.

DESCRIPTION OF EXEMPLARY EMBODIMENTS

A display system according to an embodiment of the present disclosure will be described below with reference to the drawings.

Figure 1:
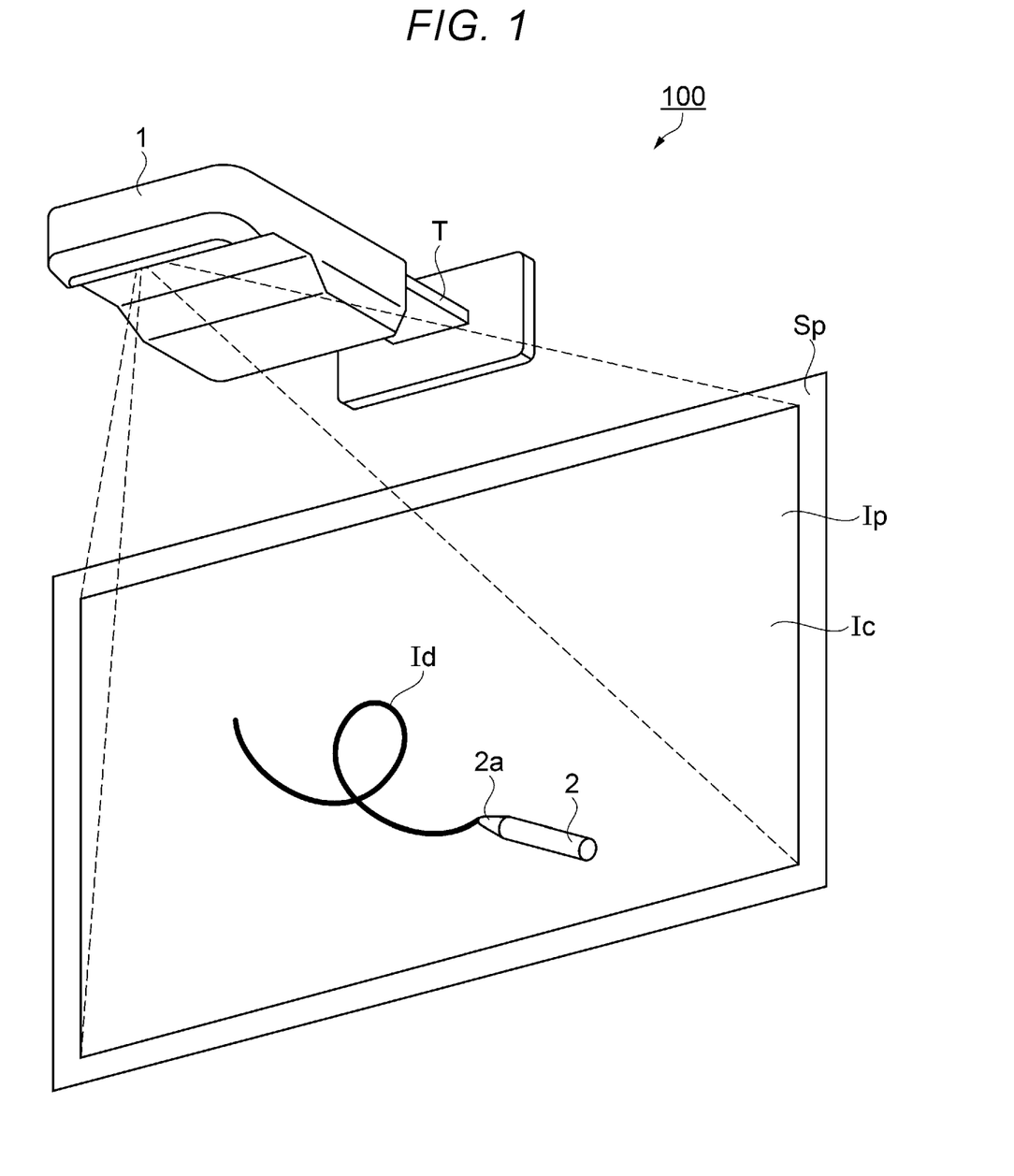
FIG. 1 is a perspective view showing a schematic configuration of a display system.

FIG. 1 is a perspective view showing a schematic configuration of a display system 100 according to the present embodiment.

The display system 100 includes a projector 1 as a display apparatus and a light emitting pen 2 as a pointing element, as shown in FIG. 1. The projector 1 projects and displays an image on a projection surface Sp as a display surface. A projection image Ip projected from the projector 1 contains an image Ic based on image information supplied from an external image supplying apparatus 3 or 4 (see FIG. 2). In the following description, the image Ic is also referred to as an "input image Ic." The projector 1 according to the present embodiment is fixed to a wall surface via a fixing member T and projects the projection image Ip toward the projection surface Sp disposed along the same wall surface. The projection surface Sp can, for example, be a screen or a whiteboard, and an aspect in which an image is projected on the wall surface itself may instead be employed.

The light emitting pen 2 has a front end where a light emitter 2a, which emits infrared light, is provided, and further includes a pressing action detector that is not shown but detects the front end's pressing action on the projection surface Sp, that is, detects contact with the projection surface Sp. The light emitter 2a repeats blinking in a predetermined light emission sequence during the period for which the light emitting pen 2 operates. The light emitter 2a changes the light emission sequence in accordance with whether or not contact has been made with the projection surface Sp. The projector 1 can therefore identify whether or not contact has been made with the light emitting pen 2 based on the light emission sequence in accordance with which the light emitter 2a emits light. The light emitting pen 2 may emit light in a wavelength region different from the infrared light wavelength region.

The projector 1 can capture an image of a range containing the projection image Ip. The projector 1 detects the light emitted by the light emitting pen 2 from the captured image and detects the position of the detected light as a pointing position at which the light emitting pen 2 is pointing. The projector 1 senses whether or not any contact with the projection surface Sp has been made based on the light emission sequence in accordance with which the detected light is emitted. The projector 1 can then display a pointer that is not shown in the detected pointing position in such a way that the pointer is superimposed on the pointing position and display an image Id formed of a line drawn along the trajectory of the pointing position where the contact has been made. In the following description, the image Id is also referred to as a "drawn image Id."

Figure 2:
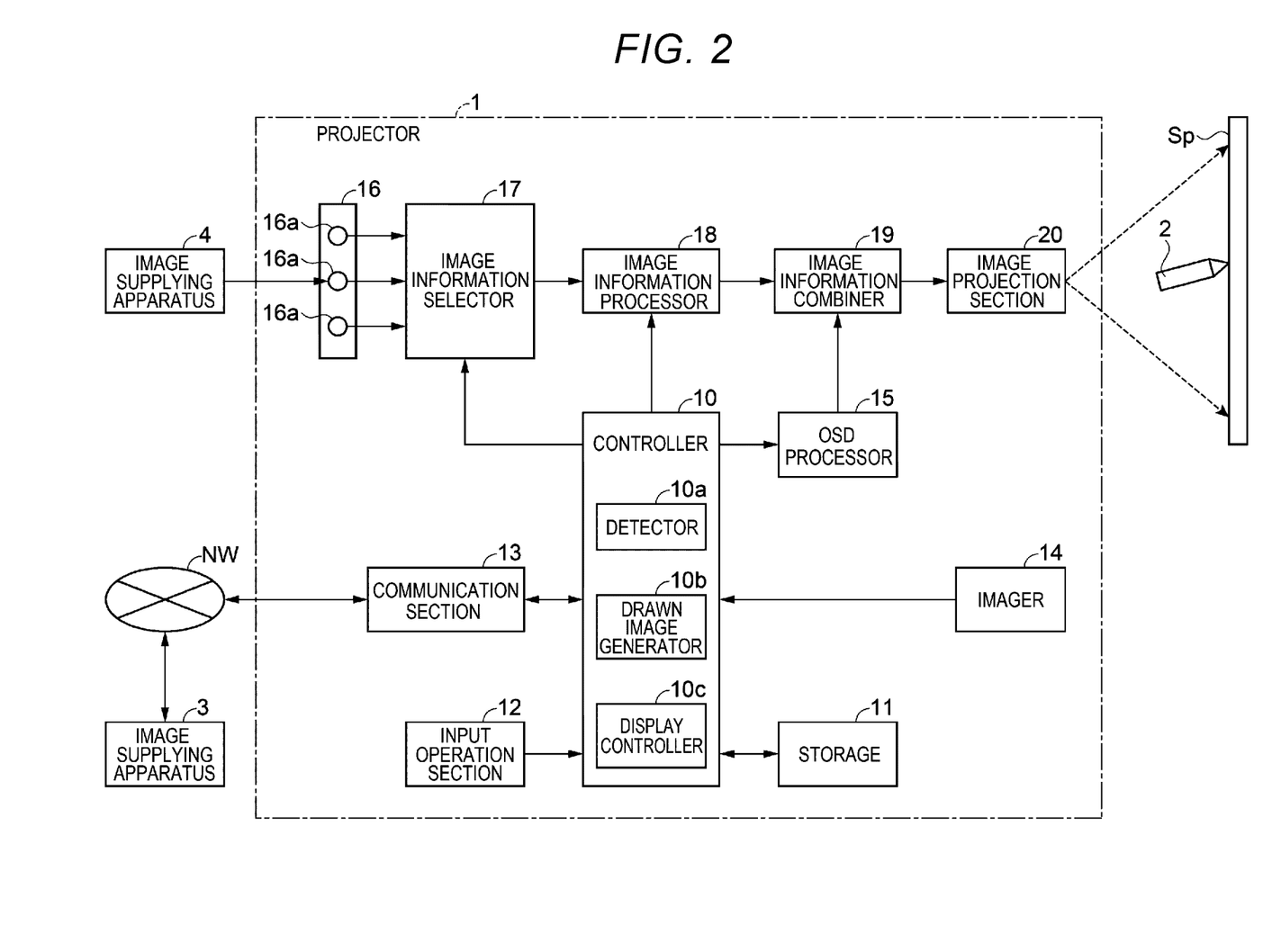
FIG. 2 is a block diagram showing a schematic configuration of a projector.
Figure 3:
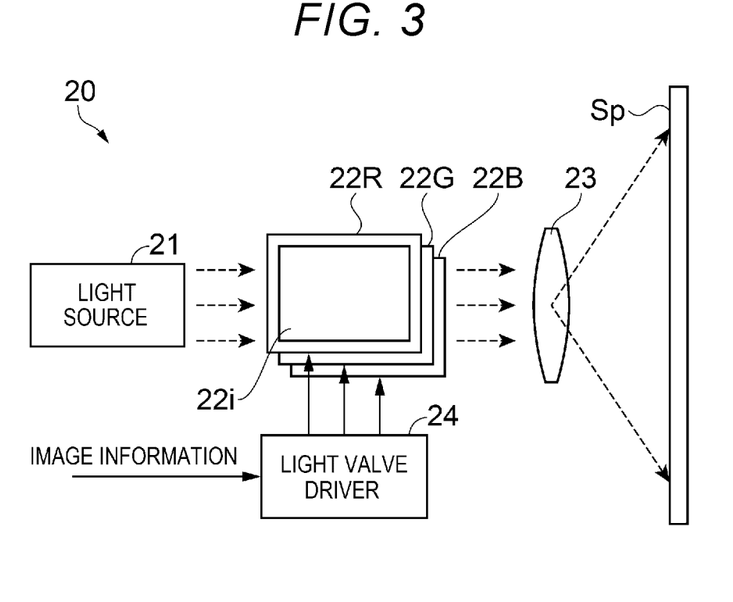
FIG. 3 is a block diagram showing a schematic configuration of an image projection section.

FIG. 2 is a block diagram showing a schematic configuration of the projector 1, and FIG. 3 is a block diagram showing a schematic configuration of an image projection section 20 provided in the projector 1.

The projector 1 includes a controller 10, a storage 11, an input operation section 12, a communication section 13, an imager 14, an OSD processor 15, an image information input section 16, an image information selector 17, an image information processor 18, an image information combiner 19, and an image projection section 20 as a display section with the components described above integrated with one another, as shown in FIG. 2. The projector 1 projects an image on the projection surface Sp via the image projection section 20 based, for example, on image information supplied from the external image supplying apparatus 3 or 4.

The controller 10 includes one or more processors and operates in accordance with a control program stored in the storage 11 to oversee and control the action of the projector 1.

The storage 11 includes a RAM (random access memory), a ROM (read only memory), and other types of memory. The RAM is used to temporarily store a variety of data and other pieces of information, and the ROM stores the control program for controlling the action of the projector 1, a variety of pieces of setting information, and other pieces of information.

The input operation section 12 includes a plurality of operation keys that allow a user to issue a variety of instructions to the projector 1. Examples of the operation keys provided in the input operation section 12 may include a power key for switching the state in which the projector 1 is powered on to the state in which the projector 1 is powered off and vice versa, a menu key for displaying a menu image for a variety of setting, a direction key for selecting an item on the menu image, and an input selection key for selecting an image interface to which image information is inputted. When a user operates any of the variety of operation keys in the input operation section 12, the input operation section 12 accepts the user's operation and outputs an operation signal according to the content of the operation to the controller 10. A remote control that is not shown but allows remote operation of the projector 1 may be used as the input operation section 12. In this case, the remote control issues an infrared operation signal according to the content of the user's operation, and a remote control signal receiver that is not shown receives the operation signal and transmits the operation signal to the controller 10.

The communication section 13 is connected to an external apparatus via a network NW, such as a LAN (local area network), and transmits and receives information to and from the apparatus under the control of the controller 10. For example, the image supplying apparatus 3 as a terminal apparatus, such as a computer and a mobile terminal, is connected to the communication section 13 via the network NW, and image information corresponding to the input image Ic is inputted from the image supplying apparatus 3 to the communication section 13. In the case where image information is inputted from the image supplying apparatus 3 to the communication section 13, the controller 10 outputs the inputted image information to the image information processor 18. The communication section 13 also thus functions as an image interface to which image information is inputted from the image supplying apparatus 3. The connection between the communication section 13 and an external apparatus may be wired connection or wireless connection.

The imager 14 is a camera including a CCD (charge coupled device) sensor, a CMOS (complementary metal oxide semiconductor) sensor, or any other imaging device that is not shown. The imager 14 includes an infrared transmission filter that absorbs visible light and transmits infrared light and captures an image formed by the infrared light emitted from the light emitting pen 2 via the infrared transmission filter. The imager 14 repeats capturing an image of the range containing the projection image Ip on the projection surface Sp under the control of the controller 10 and successively outputs image information that is the result of the image capturing to the controller 10. In the following description, the image information outputted by the imager 14 is also rerefer to as "captured image information."

The controller 10 of the projector 1 includes a detector 10a, a drawn image generator 10b as a generator, and a display controller 10c as functional blocks achieved by the control program.

The detector 10a detects the infrared light emitted by the light emitting pen 2 from the image captured by the imager 14 based on the captured image information inputted from the imager 14. The detector 10a takes as the light emitted by the light emitting pen 2 an image having brightness higher than or equal to a predetermined threshold and having a size that falls within a predetermined range out of the infrared image contained in the captured image and detects the position of the emitted light as the pointing position at which the light emitting pen 2 is pointing. The detector 10a determines, based on the captured image information acquired multiple times, the light emission sequence in accordance with which the light emitting pen 2 emits light to sense whether or not any contact with the projection surface Sp has been made.

The drawn image generator 10b generates the drawn image Id formed of a line drawn along the trajectory of the pointing position based on the result of the detection performed by the detector 10a. Specifically, when the user performs drawing operation of drawing an image with the light emitting pen 2 on the projection surface Sp, that is, when the pointing position changes with the light emitting pen 2 being in contact with the projection surface Sp, the drawn image generator 10b generates image information representing the drawn image Id based on the trajectory of the pointing position. The drawn image generator 10b generates the image information, for example, in a vector format, stores the image information in the storage 11, and successively updates the image information as time elapses. Further, the drawn image generator 10b outputs the generated image information to the display controller 10c.

The display controller 10c converts the image information in the vector format into image information in a raster format to display the drawn image Id generated by the drawn image generator 10b and outputs the converted image information to the OSD processor 15. Further, the display controller 10c deletes the currently displayed drawn image Id and switches the currently displayed drawn image Id to another. The action of the display controller 10c will be described later in detail.

The OSD processor 15 includes a frame memory that is not shown. The OSD processor 15 generates, in the frame memory, image information on a variety of OSD (on-screen display) images to be displayed simultaneously with the input image Ic under the control of the controller 10. Examples of the OSD images may include not only the pointer displayed in the pointing position, the drawn image Id generated by the drawn image generator 10b but the menu image displayed when the menu key is operated, a message image for notifying the user of a variety of messages, and other images. The OSD processor 15 outputs image information on a generated OSD image to the image information combiner 19 under the control of the controller 10.

Image information is inputted from the external image supplying apparatus 4, such as a computer and a variety of video instruments, to the image information input section 16. The image information input section 16 includes a plurality of input terminals 16a, which each serve as an image interface connected to the image supplying apparatus 4, and interface circuits that are not shown but correspond to the input terminals 16a and accepts image information corresponding to the input image Ic and supplied from the image supplying apparatus 4. The image information input section 16 and the image supplying apparatus 4 are connected to each other not via the network NW but via a cable for image transmission. The input terminals 16a provided in the image information input section 16 are formed, for example, of an HDMI (registered trademark) (High Definition Multimedia Interface) terminal to be connected to a HDMI-compatible video instrument or computer, a computer terminal to which an analog RGB signal is primarily inputted from a computer, and a video terminal to which a composite signal is primarily input from a video instrument. The image information inputted to any of the input terminals 16a of the image information input section 16 is outputted to the image information selector 17.

The image information selector 17 selects one of the input terminals 16a provided in the image information input section 16 and outputs the image information inputted to the selected input terminal 16a to the image information processor 18 under the control of the controller 10. The user can select one of the plurality of image interfaces by operating the input selection key provided in the input operation section 12. The user selectable options may include "HDMI," "Computer," "Video," and "Network," and when "HDMI," "Computer," or "Video" is selected, the controller 10 instructs the image information selector 17 to cause it to select the input terminal 16a corresponding to the selected image interface, that is, the HDMI terminal, the computer terminal, or the video terminal as the image interface.

On the other hand, when the user selects "Network" via the input selection key, the controller 10 causes the image information selector 17 not to select any of the input terminals 16a but instead outputs the image information inputted from the communication section 13 to the image information processor 18. That is, in this case, the controller 10 selects the communication section 13 as the image interface.

The image information processor 18 includes a frame memory that is not shown. The image information processor 18 stores image information on the input image Ic inputted from the image information selector 17 or the controller 10 in the frame memory, performs a variety of types of processing on the image information in the frame memory under the control of the controller 10, and outputs the processed image information to the image information combiner 19. For example, the image information processor 18 performs adjustment of the image quality, such as brightness and contrast, correction of image distortion, and other processing as required on the image information.

The image information combiner 19 combines an OSD image with the input image Ic under the control of controller 10. Specifically, the image information combiner 19 combines image information on the input image Ic inputted from the image information processor 18 with image information on an OSD image inputted from the OSD processor 15. That is, assuming that the input image Ic stored in the frame memory of the image information processor 18 forms a first layer and the OSD image stored in the frame memory of the OSD processor 15 forms a second layer, the image information combiner 19 superimposes the first and second layers on each other. The image information combiner 19 outputs information on the combined image to a light valve driver 24 (see FIG. 3) of the image projection section 20.

The OSD processor 15, the interface circuits of the image information input section 16, the image information selector 17, the image information processor 18, and the image information combiner 19 may be formed, for example, of one or more processors or may be formed of a dedicated processor, such as an ASIC (application specific integrated circuit) and an FPGA (field programmable gate array).

The image projection section 20 includes a light source 21, three liquid crystal light valves 22R, 22G, and 22B as a light modulator, a projection system 23, the light valve driver 24, and other components, as shown in FIG. 3. In the image projection section 20, the light outputted from the light source 21 is modulated by the liquid crystal light valves 22R, 22G, and 22B into image light, and the image light is projected via the projection system 23 including at least one of a lens and a mirror to display an image on the projection surface Sp. The image display operation performed by the image projection section 20 is controlled by the controller 10 via the image information selector 17, the image information processor 18, and the OSD processor 15.

The light source 21 is formed of a discharge-type light source lamp, such as an ultrahigh-pressure mercury lamp and a metal halide lamp, or a solid-state light source, such as a light emitting diode and a semiconductor laser. The light outputted from the light source 21 is converted by an optical integration system that is not shown into light having a substantially uniform luminance distribution, the converted light is separated by a color separation system that is not shown into color light components of red, green, and blue, which are the three primary colors of light, and the red, green, and blue light components are then incident on the liquid crystal light valves 22R, 22G, and 22B.

The liquid crystal light valves 22R, 22G, and 22B are each formed, for example, of a transmissive liquid crystal panel including a liquid crystal material encapsulated between a pair of transparent substrates. A rectangular pixel region 22i formed of a plurality of pixels arranged in a matrix is formed in each of the liquid crystal panels, and drive voltage is applicable to the liquid crystal material on a pixel basis.

The light valve driver 24 forms an image on a pixel region 22i of each of the liquid crystal light valves 22R, 22G, and 22B. Specifically, the light valve driver 24 applies drive voltage according to the image information inputted from the image information combiner 19 to each of the pixels in the pixel region 22i to set the light transmittance at the pixel at a value according to the image information. The light outputted from the light source 21 passes through the image region 22i of each of the liquid crystal light valves 22R, 22G, and 22B, which modulate the light on a pixel basis, whereby an image light flux according to the image information is formed on a color light basis. The thus formed color image light fluxes are combined with one another by a light combining system that is not shown on a pixel basis into image light representing a color image, which is enlarged and projected by the projection system 23 on the projection surface Sp. As a result, the projection image Ip containing the input image Ic and the drawn image Id or any other OSD image is displayed on the projection surface Sp.

Referring back to FIG. 2, the drawn image generator 10b, when it stores image information on the generated drawn image Id in the storage 11, stores the image information in correspondence with information on an image source of the currently displayed input image Ic. In the present embodiment, it is assumed that the image source is any of the input terminals 16a provided in the image information input section 16 and the image supplying apparatus 3, which supplies the communication section 13 with image information.

Specifically, when the input image Ic is displayed based on the image information inputted from the image supplying apparatus 4 to the image information input section 16, the drawn image generator 10b stores the image information on the generated drawn image Id in correspondence with the input terminal 16a selected by the image information selector 17. More specifically, the plurality of input terminals 16a provided in the image information input section 16 each have terminal information that is assigned thereto and identifies the input terminal 16a, and the drawn image generator 10b stores the image information on the drawn image Id in correspondence with the terminal information. The terminal information is a number formed, for example, of a numeral and may instead be information containing a letter.

On the other hand, when the input image Ic is displayed based on image information inputted from the image supplying apparatus 3 to the communication section 13 over the network NW, the drawn image generator 10b stores the generated drawn image Id in correspondence not only with the communication section 13 but with identification information for identifying the image supplying apparatus 3. In the present embodiment, the IP (Internet protocol) address of the image supplying apparatus 3 is used as the identification information. The identification information is not limited to the IP address and may be any information that allows identification of the image supplying apparatus 3, such as the MAC address and other pieces of information. In a case where the network NW is a relatively small-scale network, the identification information may, for example, be information on a number or a letter so assigned by the user that the thus assigned identification information does not conflict with the identification information that identifies any other image supplying apparatus 3.

The display controller 10c, when it switches the input image Ic displayed by the image projection section 20 to another based, for example, on the user's operation of the input selection key, deletes the drawn image Id having been displayed and causes the image projection section 20 to display the drawn image Id corresponding to the image source of an input image Ic to be newly displayed. Specifically, when an input image Ic is displayed based on image information inputted to the image information input section 16, the display controller 10c reads image information on the drawn image Id corresponding to a newly selected input terminal 16a from the storage 11. On the other hand, when an input image Ic is displayed based on image information inputted from the image supplying apparatus 3 to the communication section 13 over the network NW, the display controller 10c reads image information on the drawn image Id corresponding to the IP address of the image supplying apparatus 3 from the storage 11. When the display controller 10c converts the read image information into image information in the raster format and outputs the converted image information to the OSD processor 15, the drawn image Id corresponding to the new image source is combined with the input image Ic, and the combined image is projected via the image projection section 20.

The display controller 10c further outputs the read image information to the drawn image generator 10b. Afterward, the drawn image generator 10b updates the image information on the drawn image Id in accordance with the user's drawing operation. In a case where no image information on the corresponding drawn image Id is stored in the storage 11, the display controller 10c outputs no image information on the drawn image Id to the OSD processor 15. That is, in this case, the display controller 10c causes the image projection section 20 to display no drawn image Id.

Figure 4:
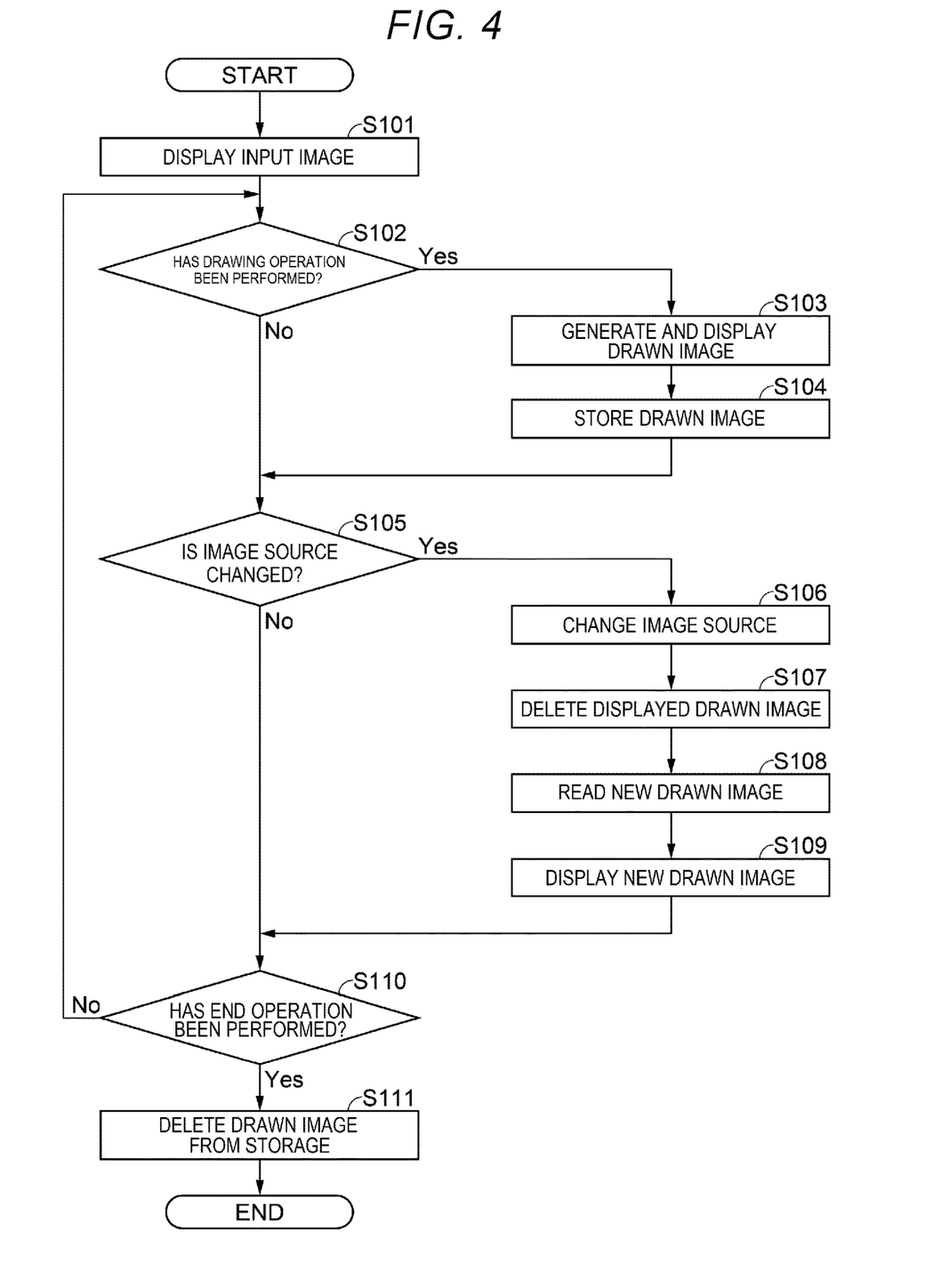
FIG. 4 is a flowchart for describing the action of the projector.

FIG. 4 is a flowchart for describing a method for controlling the projector 1, that is, the action of the projector 1. When the projector 1 is powered on, the controller 10 performs a variety of initial actions and then operates in accordance with the procedure shown in FIG. 4.

In step S101, the controller 10 carries out the process of displaying the input image Ic via the image projection section 20 based on image information inputted to the image interface selected in the last action, as shown in FIG. 4. That is, the controller 10 causes the image projection section 20 to project the input image Ic based on image information inputted to the input terminal 16a selected by the image information selector 17 out of the input terminals 16a of the image information input section 16 or image information inputted from the image supplying apparatus 3 to the communication section 13.

In step S102, the controller 10 evaluates based on the result of the detection performed by the detector 10a whether or not drawing operation using the light emitting pen 2 has been performed, that is, whether or not the pointing position has changed with the light emitting pen 2 remaining in contact with the projection surface Sp. Thereafter, the controller 10 proceeds to the process in step S103 when drawing operation has been performed, whereas the controller 10 proceeds to the process in step S105 when no drawing operation has been performed.

In the case where drawing operation using the light emitting pen 2 has been performed and the controller 10 proceeds to step S103, the drawn image generator 10b generates image information on the drawn image Id formed of a line drawn along the trajectory of the pointing position and outputs the image information to the display controller 10c. When the display controller 10c converts the image information into image information in the raster format and outputs the converted image information to the OSD processor 15, the drawn image Id is combined with the input image Ic, and the combined image is displayed via the image projection section 20 on the projection surface Sp. In the subsequent step S104, the drawn image generator 10b stores the image information on the generated drawn image Id in the storage 11 in correspondence with the image source of the input image Ic.

In step S105, the controller 10 evaluates whether or not a change condition for changing the image source of the input image Ic has been satisfied. For example, when image interface switching operation is performed by use of the input selection key, the controller 10 determines that the change condition has been satisfied. Instead, when control information requesting that the image supplying apparatus 3, which supplies image information, is changed in the state in which the communication section 13 has been selected as the image interface, the controller 10 determines that the change condition has been satisfied. In the case where the change condition has been satisfied, the controller 10 proceeds to the process in Step S106, whereas when the change condition has not been satisfied, the controller 10 proceeds to the process in Step S110.

In the case where the change condition has been satisfied and the controller 10 proceeds to the process in step S106, the controller 10 changes the image source of the input image Ic. For example, when a new input terminal 16a has been selected via the input selection key, the controller 10 instructs the image information selector 17 to select the new input terminal 16a. In a case where the communication section 13 has been newly selected as the image interface via the input selection key, the controller 10 connects the projector 1 to the image supplying apparatus 3 over the network. Afterward, the communication section 13 accepts image information supplied form the image supplying apparatus 3, and the controller 10 causes the image projection section 20 to display the input image Ic based on the image information. Further, when control information requesting that the image supplying apparatus 3, which supplies image information, is changed is transmitted in the state in which the communication section 13 has been selected as the image interface, the controller 10 connects the projector 1 to a new image supplying apparatus 3 over the network. Afterward, the communication section 13 accepts image information supplied form the new image supplying apparatus 3, and the controller 10 causes the image projection section 20 to display the input image Ic based on the image information.

In step S107, the display controller 10c instructs the OSD processor 15 to delete the drawn image Id having been displayed on the projection surface Sp, that is, the drawn image Id displayed before the image source is changed. When the OSD processor 15 receives the instruction and deletes the drawn image Id in the frame memory, the drawn image Id is removed from the projection image Ip projected by the image projection section 20. The deletion of the drawn image Id described herein means that the display of the drawn image Id is terminated but the image information on the drawn image Id stored in the storage 11 is maintained.

In step S108, the display controller 10c reads image information on the drawn image Id associated with the image source of the new input image Ic, that is, the image source after the change. That is, when the input image Ic is displayed based on image information inputted to the newly selected input terminal 16a, the controller 10 reads image information on the drawn image Id associated with the input terminal 16a. On the other hand, when the input image Ic is displayed based on image information inputted from the image supplying apparatus 3 connected to the projector 1 via the network NW, the controller 10 reads image information on the drawn image Id associated with the new image supplying apparatus 3.

In step S109, the display controller 10c displays a new drawn image Id based on the read image information on the projection surface Sp. Specifically, the display controller 10c convers the image information on the read drawn image Id into image information in the raster format and outputs the converted image information to the OSD processor 15. As a result, the new drawn image Id is combined with the input image Ic, and the combined image is projected via the image projection section 20. The display controller 10c also outputs the read image information to the drawn image generator 10b and updates the image information in accordance with the following drawing operation. In a case where no drawn image Id associated with a new image source is stored in the storage 11, steps S108 and S109 are skipped.

In step S110, the controller 10 evaluates whether or not the user has performed end operation that instructs the end of image projection. In a case where no end operation has been performed, the controller 10 returns to the process in step S102, whereas when the end operation has been performed, the controller 10 proceeds to the process in step S111.

In a case where the end operation has been performed and the controller 10 proceeds to the process in step S111, the display controller 10c deletes the image information on the drawn image Id stored in the storage 11, and the procedure ends. The image information on the drawn image Id may instead remain stored in the storage 11 after the end of the procedure, and the drawn image Id corresponding to the image source may be reproduced in the following action.

Figure 5A:
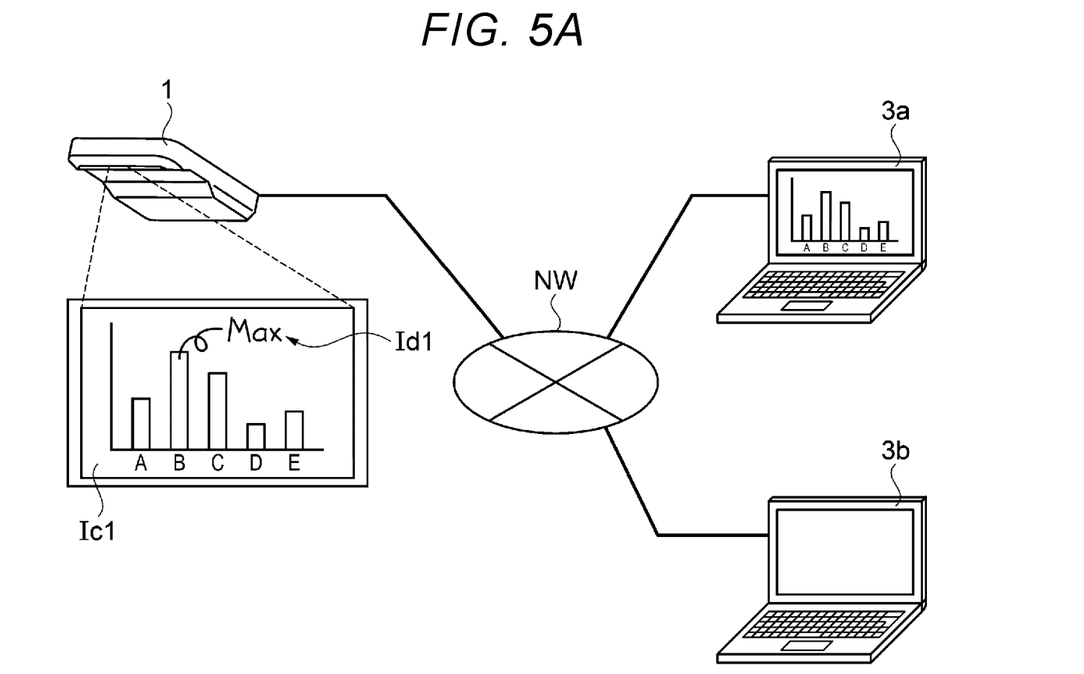
FIG. 5A is a descriptive diagram for describing an example of a specific action of the projector.
Figure 5B:
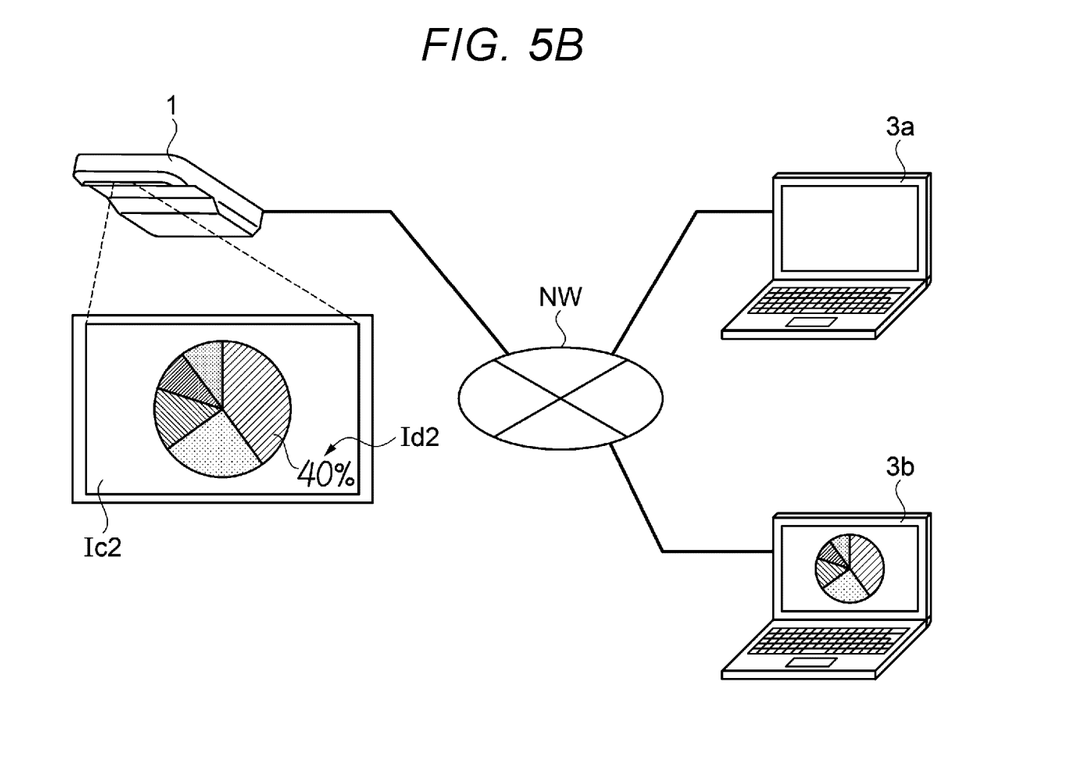
FIG. 5B is a descriptive diagram for describing the example of a specific action of the projector.

FIGS. 5A and 5B are descriptive diagrams for describing an example of a specific action of the projector 1.

The projector 1 is connected to two image supplying apparatuses 3, that is, a first image supplying apparatus 3a and a second image supplying apparatus 3b via the network NW, as shown in FIGS. 5A and 5B. The storage 11 of the projector 1 stores image information on a first drawn image Id1 associated with the IP address of the first image supplying apparatus 3a and image information on a second drawn image Id2 associated with the IP address of the second image supplying apparatus 3b. In FIG. 5A, the projector 1 accepts image information supplied from the first image supplying apparatus 3a, projects a first input image Ic1 based on the image information via the image projection section 20, combines the first drawn image Id1 with the first input image Ic1, and causes the image projection section 20 to display the combined image. When the projector 1 receives from the second image supplying apparatus 3b a control signal requesting that the image supplying apparatus 3 is changed, the projector 1 is connected to the second image supplying apparatus 3b over the network and accepts image information supplied from the second image supplying apparatus 3b afterward. As a result, the projector projects a second drawn image Ic2 based on the image information via the image projection section 20 and deletes the first drawn image Id1 having been displayed, as shown in FIG. 5B. The projector 1 then reads the second drawn image Id2 corresponding to the IP address of the second image supplying apparatus 3b from the storage 11, combines the second drawn image Id2 with the second input image Ic2, and causes the image projection section 20 to display the combined image.

As described above, the display system 100, the projector 1, and the method for controlling the display system 100 and the projector 1 according to the present embodiment can provide the following effects.

(1) According to the present embodiment, the drawn image Id is stored in the storage 11 in association with the image interface, such as any of the input terminals 16a and the communication section 13, and the projector 1 displays the drawn image Id according to the image interface. Therefore, even when the image interface selected via the input selection key is changed, the drawn image Id suitable for the new image information, that is, the new image supplying apparatus 3 or 4 can be displayed with no large burden on the projector 1.

(2) According to the present embodiment, the drawn image Id is stored in the storage 11 in association with the IP address of the image supplying apparatus 3, which supplies image information via the network NW, and the projector 1 displays the drawn image Id according to the IP address of the image supplying apparatus 3. Therefore, even when the image supplying apparatus 3, which supplies the communication section 13 with image information, is changed, the drawn image Id suitable for the changed image supplying apparatus 3 can be displayed with no large burden on the projector 1.

(3) According to the present embodiment, when the image supplying apparatus 3 or 4, which supplies image information, is changed, the drawn image Id having been displayed is deleted, whereby the drawn image Id does not prevent visual recognition of the input image Ic to be displayed next.

In the embodiment described above, the controller 10 and the image information selector 17 in the process of selecting the image interface correspond to a selector. The communication section 13 corresponds to a first image interface.

Variations

The embodiment described above may be changed as follows.

In the embodiment described above, an aspect in which the drawing operation is performed with the light emitting pen 2, which issues infrared light, has been presented, and a configuration that allows detection of drawing operation performed with a pointing element that issues no infrared light, such as the user's finger, may instead be employed. For example, a configuration in which an illuminator that emits planar infrared light along the projection surface Sp is disposed and the imager 14 captures an image formed by the infrared light reflected off a pointing element can be employed. Further, the aspect in which the imager 14 captures an image formed by infrared light is not necessarily employed, and an aspect in which visible light is captured and the pointing position at which the pointing element points is detected based on image processing, such as pattern matching, may instead be employed. Still instead, a configuration in which a plurality of imagers 14 are provided to further allow detection of the position of the pointing element in the depth direction may be employed. Instead of providing the imager 14, a touch sensor capable of detecting contact of the pointing element with the projection surface Sp may be disposed on the projection surface Sp.

In the embodiment described above, the aspect in which the image interface is switched to another via the input selection key may be replaced with an aspect in which the image interface is successively switched whenever the input selection key is operated. Further, when the input selection key is operated, a list of image interfaces may be displayed as an OSD image, and the user may be prompted to select a desired image interface from the list. Instead, an aspect in which a plurality of input selection keys corresponding to different image interfaces are disposed in the input operation section 12 and the current image interface is switched to an image interface corresponding to an operated input selection key may be employed.

Figure 6:
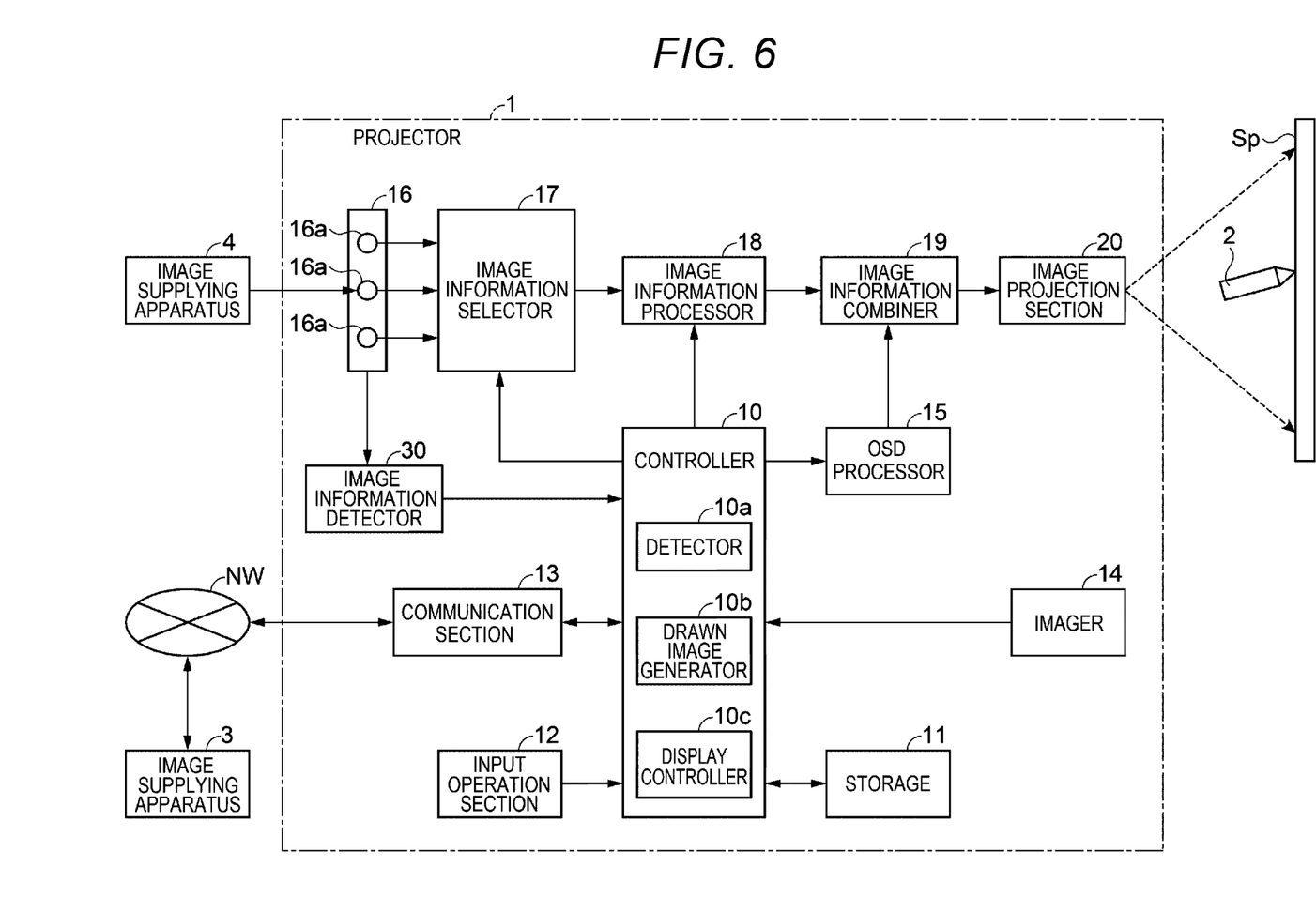
FIG. 6 is a block diagram showing a schematic configuration of a projector according to a variation.

The image interface may still instead be switched when the input of image information to any of the input terminals 16a starts. For example, the projector 1 may be provided with an image information detector 30, which detects input of image information to any of the input terminals 16a, as shown in FIG. 6, and the controller 10 may cause the image information selector 17 to select, based on the result of the detection performed by the image information detector 30, the input terminal 16a where the input of image information has been detected.

In the embodiment described above, the transmissive liquid crystal light valves 22R, 22G, and 22B are used as the light modulator, and reflective light modulators, such as reflective liquid crystal light valves, can also be used. Still instead, a digital mirror device or any other similar device can be used. In this case, the digital mirror device modulates the light outputted from the light source 21 by controlling the direction in which incident light exits for each micromirror that serves as a pixel. Still instead, a plurality of light modulators are not necessarily provided on a color light basis, and a single light modulator may modulate a plurality of color light fluxes in a time division manner.

In the embodiment described above, the projector 1 has been described as an example of the display apparatus. The display apparatus is, however, not limited to the projector 1 and may instead be another display apparatus, such as a liquid crystal display and an organic EL display. In these cases, a display screen on which an image is displayed corresponds to the display surface and the display section. Further, to detect the user's drawing operation, a touch panel formed of a touch sensor disposed on the display screen may be used.

Contents derived from the embodiment are described below.

A display apparatus includes a communication section that accepts image information supplied from an image supplying apparatus over a network, a display section that displays an image based on the image information accepted by the communication section on a display surface, a detector that detects a pointing position on the display surface at which a pointing element is pointing, a generator that generates a drawn image based on the pointing position detected by the detector, a display controller that causes the display section to display the drawn image generated by the generator, and a storage that stores the drawn image in association with identification information for identifying the image supplying apparatus. In a case where the image supplying apparatus, which supplies the communication section with the image information, is changed, the display controller reads the drawn image corresponding to the identification information that identifies the changed image supplying apparatus from the storage and causes the display section to display the read drawn image.

According to the configuration described above, a drawn image is stored in the storage in association with the identification information that identifies the image supplying apparatus, and the display apparatus displays a drawn image according to the identification information that identifies the image supplying apparatus. Therefore, even when the image supplying apparatus, which supplies the communication section with image information, is changed, a drawn image suitable for the changed image supplying apparatus can be displayed with no large burden on the display apparatus.

In the display apparatus described above, the identification information may be an IP address of the image supplying apparatus.

According to the configuration described above, the IP address of the image supplying apparatus is used as the identification information, whereby the image supplying apparatus can be readily identified.

In the display apparatus described above, when the image supplying apparatus, which supplies the communication section with image information, is changed, the display controller may delete the drawn image displayed before the change.

According to the configuration described above, when the image supplying apparatus, which supplies the image information, is changed, the drawn image having been displayed before is deleted, whereby the drawn image does not prevent visual recognition of an image to be displayed next.

In the display apparatus described above, a first image supplying apparatus that is the image supplying apparatus and a second image supplying apparatus that is the image supplying apparatus may be connected to the communication section. A first drawn image corresponding to the identification information that identifies the first image supplying apparatus and a second drawn image corresponding to the identification information that identifies the second image supplying apparatus may be stored in the storage. The communication section may accept the image information supplied from the first image supplying apparatus. When the communication section accepts the image information supplied from the second image supplying apparatus in the state in which the display controller causes the display section to display the first drawn image, the display controller may delete the first drawn image displayed by the display section and cause the display section to display the second drawn image.

According to the configuration described above, a drawn image suitable for an image supplying apparatus can be readily displayed.

A display apparatus includes a plurality of image interfaces that accept image information supplied from an image supplying apparatus, a selector that selects one image interface from the plurality of image interfaces, a display section that displays an image based on the image information supplied to the image interface selected by the selector on a display surface, a detector that detects a pointing position on the display surface at which a pointing element is pointing, a generator that generates a drawn image based on the pointing position detected by the detector, a display controller that causes the display section to display the drawn image generated by the generator, and a storage that stores the drawn image in association with the image interface selected by the selector. In a case where the image interface selected by the selector is changed, the display controller reads the drawn image corresponding to the changed image interface from the storage and causes the display section to display the read drawn image.

According to the configuration described above, a drawn image is stored in the storage in association with the image interface, and the display apparatus displays a drawn image according to the image interface. Therefore, even when the image interface selected by the selector is changed, a drawn image suitable for a new image interface, that is, a new image supplying apparatus can be displayed with no large burden on the display apparatus.

In the display apparatus described above, when the image interface selected by the selector is a first image interface that accepts the image information supplied from the image supplying apparatus via a network, the storage may store the drawn image in association with identification information for identifying the image supplying apparatus, which supplies the image information. When the image supplying apparatus, which supplies the first image interface with the image information, is changed, the display controller may read the drawn image corresponding to the identification information that identifies the changed image supplying apparatus and cause the display section to display the read drawn image.

According to the configuration described above, when the image interface selected by the selector is the first image interface that accepts the image information supplied from the image supplying apparatus via a network, the storage stores the drawn image in association with the identification information for identifying the image supplying apparatus. Therefore, even when the image supplying apparatus, which supplies the first image interface with image information, is changed, a drawn image suitable for the changed image supplying apparatus can be displayed with no large burden on the display apparatus.

A method for controlling a display apparatus includes accepting image information supplied from an image supplying apparatus over a network, displaying an image based on the image information on a display surface, detecting a pointing position on the display surface at which a pointing element is pointing, generating a drawn image based on the detected pointing position, displaying the drawn image on the display surface, and storing the drawn image in a storage in association with identification information for identifying the image supplying apparatus. In a case where the image supplying apparatus, which supplies the image information, is changed, the drawn image corresponding to the identification information that identifies the changed image supplying apparatus is read from the storage and displayed on the display surface.

According to the configuration described above, a drawn image is stored in association with the identification information that identifies the image supplying apparatus, and the display apparatus displays a drawn image according to the identification information that identifies the image supplying apparatus. Therefore, even when the image supplying apparatus, which supplies the image information, is changed, a drawn image suitable for the changed image supplying apparatus can be displayed with no large burden on the display apparatus.

A method for controlling a display apparatus includes selecting one image interface from a plurality of image interfaces that each accept image information supplied from an image supplying apparatus, displaying an image based on the image information supplied to the selected image interface on a display surface, detecting a pointing position on the display surface at which a pointing element is pointing, generating a drawn image based on the detected pointing position, displaying the drawn image on the display surface, and storing the drawn image in a storage in association with the selected image interface. In a case where the selected image interface is changed, the drawn image corresponding to the changed image interface is read from the storage and displayed on the display surface.

According to the configuration described above, a drawn image is stored in association with the image interface, and a drawn image according to the image interface is displayed. Therefore, even when the selected image interface is changed, a drawn image suitable for a new image interface, that is, a new image supplying apparatus can be displayed with no large burden on the display apparatus.

What is claimed is:

1. A display apparatus comprising:
a communication device configured to accept image information supplied from an image supplying apparatus over a network;
a display section that displays an image based on the image information accepted by the communication device on a display surface;
at least one processor and memory programmed to perform the following:
   detect a pointing position on the display surface at which a pointing element is pointing;
   generate a drawn image based on the detected pointing position; and
   a display controller that causes the display section to display the drawn image generated by the processor; and
a storage that stores, in the display apparatus, the drawn image in association with identification information for identifying the image supplying apparatus after the drawn image is drawn on the display surface, the image supplying apparatus being a first mobile terminal,
wherein when the image supplying apparatus, which supplies the communication device with the image information, is changed to a second image supplying apparatus, the second image supplying apparatus being a second mobile terminal different from the first mobile terminal, the display controller reads the drawn image corresponding to the identification information that identifies the changed image supplying apparatus by checking for the drawn image in the storage of the display apparatus and causes the display section to display the read drawn image.

2. The display apparatus according to claim 1, wherein when the image supplying apparatus, which supplies the communication device with image information, is changed, the display controller deletes the drawn image displayed before the change.

3. The display apparatus according to claim 1, wherein a first image supplying apparatus that is the image supplying apparatus and a second image supplying apparatus that is the image supplying apparatus are connected to the communication device, a first drawn image corresponding to the identification information that identifies the first image supplying apparatus and a second drawn image corresponding to the identification information that identifies the second image supplying apparatus are stored in the storage, the communication device accepts the image information supplied from the first image supplying apparatus, and when the communication device accepts the image information supplied from the second image supplying apparatus in the state in which the display controller causes the display section to display the first drawn image, the display controller deletes the first drawn image displayed by the display section and causes the display section to display the second drawn image.

4. A display apparatus comprising:
a plurality of image interfaces that accept image information supplied from an image supplying apparatus, the image supplying apparatus being a first mobile terminal;
a selector that selects one image interface from the plurality of image interfaces;
a display section that displays an image based on the image information supplied to the image interface selected by the selector on a display surface;

at least one processor and memory programmed to perform the following:
  detect a pointing position on the display surface at which a pointing element is pointing; and
  generate a drawn image based on the detected pointing position;
a display controller that causes the display section to display the drawn image generated by the processor; and
a storage that stores the drawn image in association with the image interface selected by the selector,
wherein when the image interface selected by the selector is changed, the display controller reads the drawn image corresponding to the changed image interface from the storage and causes the display section to display the read drawn image, and
wherein when the image interface selected by the selector is the first image interface that accepts the image information supplied from the image supplying apparatus via a network, the storage stores, in the display apparatus, the drawn image in association with identification information for identifying the image supplying apparatus after the drawn image is drawn on the display surface, which supplies the image information, and
when the image supplying apparatus, which supplies the first image interface with the image information, is changed to a second image supplying apparatus, the second image supplying apparatus being a second mobile terminal different from the first mobile terminal, the display controller reads the drawn image corresponding to identification information that identifies the changed image supplying apparatus by checking for the drawn image in the storage of the display apparatus and causes the display section to display the read drawn image.

5. A method for controlling a display apparatus, the method comprising:
  accepting image information supplied from an image supplying apparatus over a network;
  displaying an image based on the image information on a display surface;
  detecting a pointing position on the display surface at which a pointing element is pointing;
  generating a drawn image based on the detected pointing position;
  displaying the drawn image on the display surface; and
  storing, in the display apparatus, the drawn image in a storage in association with identification information for identifying the image supplying apparatus after the drawn image is drawn on the display surface, the image supplying apparatus being a first mobile terminal
  wherein when the image supplying apparatus, which supplies the image information, is changed to a second image supplying apparatus, the second image supplying apparatus being a second mobile terminal different from the first mobile terminal, the drawn image corresponding to the identification information that identifies the changed image supplying apparatus is determined by checking for the drawn image the storage of the display apparatus, and is displayed on the display surface.

* * * * *